US008861468B2

(12) United States Patent
Lee (10) Patent No.: US 8,861,468 B2
(45) Date of Patent: Oct. 14, 2014

(54) METHOD AND APPARATUS FOR REPORTING TIME INFORMATION ASSOCIATED WITH RANDOM ACCESS IN A WIRELESS COMMUNICATION SYSTEM (75) Inventor: Ki Dong Lee, San Diego, CA (US)

(73) Assignee: LG Electronics Inc., Seoul (KR)

( * ) Notice: Subject to any disclaimer, the term of this patent is extended or adjusted under 35 U.S.C. 154(b) by 84 days.

(21) Appl. No.: 13/584,249

(22) Filed: Aug. 13, 2012

(65) Prior Publication Data
US 2013/0039308 A1 Feb. 14, 2013

Related U.S. Application Data (60) Provisional application No. 61/523,236, filed on Aug. 12, 2011, provisional application No. 61/542,054, filed on Sep. 30, 2011.

(30) Foreign Application Priority Data

Aug. 13, 2012 (WO) ................ PCT/KR2012/006435

(51) Int. Cl.
*H04W 4/00* (2009.01)
*H04W 74/08* (2009.01)

(52) U.S. Cl.
CPC ................ *H04W 74/0833* (2013.01)
USPC ......................................................... 370/329

(58) Field of Classification Search
CPC ................ H04W 72/04; H04Q 9/00
USPC ........................ 370/328, 329, 338
See application file for complete search history.

(56) References Cited

U.S. PATENT DOCUMENTS

| 8,195,208 | B2* | 6/2012 | Son ................................. 455/466 |
| 2009/0010192 | A1* | 1/2009 | Huang et al. .................. 370/311 |
| 2010/0124213 | A1* | 5/2010 | Ise et al. ......................... 370/338 |
| 2011/0164587 | A1* | 7/2011 | Seo ................................. 370/329 |
| 2011/0299415 | A1 | 12/2011 | He et al. |

FOREIGN PATENT DOCUMENTS

| KR | 10-2009-0074106 A | 7/2009 |
| KR | 10-2010-0091873 A | 8/2010 |
| WO | WO 2010/105518 A1 | 9/2010 |

* cited by examiner

*Primary Examiner* — Andrew Chriss
*Assistant Examiner* — Voster Preval
(74) *Attorney, Agent, or Firm* — Birch, Stewart, Kolasch & Birch, LLP (57) ABSTRACT A method and apparatus for reporting time information associated with random access procedure and back-off process are provided. The method applicable to a user equipment proposes to record time stamp information related to random access procedure. For instance, the UE records time information indicating when an initial random access preamble is transmitted and additional time information indicating when the UE succeeds in contention resolution. By reporting the time information, the UE allows a network to calculate workperiod during which the UE performs a successful random access procedure.

6 Claims, 7 Drawing Sheets

METHOD AND APPARATUS FOR REPORTING TIME INFORMATION ASSOCIATED WITH RANDOM ACCESS IN A WIRELESS COMMUNICATION SYSTEM

CROSS-REFERENCE TO RELATED APPLICATIONS

The present application for patent claims priority to Provisional Application Nos. 61/523,236 filed on Aug. 12, 2011 and 61/542,054 filed on Sep. 30, 2011, and International Application No. PCT/KR2012/006435 filed on Aug. 13, 2012, which are incorporated herein by reference.

BACKGROUND OF THE INVENTION

1. Field of the Invention

The technical features of this document relate to wireless communications using a number of orthogonal frequency division multiple (OFDM) symbols, and more particularly, to a method and apparatus for reporting time information associated with random access via radio resource control (RRC) signalling.

2. Related Art

The Third Generation Partnership Project (3GPP) Long Term Evolution (LTE) which is a set of enhancements to the Universal Mobile Telecommunications System (UMTS) is introduced as 3GPP Release 8. The 3GPP LTE uses orthogonal frequency division multiple access (OFDMA) for a downlink, and uses single carrier frequency division multiple access (SC-FDMA) for an uplink, and adopts multiple input multiple output (MIMO) with up to four antennas. In recent years, there is an ongoing discussion on 3GPP LTE-Advanced (LTE-A), which is a major enhancement to the 3GPP LTE.

SUMMARY OF THE INVENTION

The technical features of this document provide a method of reporting time information associated with random access via radio resource control (RRC) signalling. The method is performed by a user equipment (UE) communicating with a base station.

In one aspect, the method comprises transmitting a random access preamble to a base station; if the random access preamble is an initial random access preamble transmitted after a new random access procedure is initiated, storing first time stamp information indicating when the initial random access preamble is transmitted to the BS, and setting flag information on; receiving, in response to the random access preamble, a random access response from the BS; transmitting, in response to the random access response, a scheduled message to the BS; receiving, in response to the scheduled message, a contention resolution message from the BS; if the flag information is set to on, storing, in response to the contention resolution message, second time stamp information indicating when contention resolution message is received, and setting the flag information off; receiving a UE information request message from the BS; and transmitting, in response to the UE information request message, a UE information response message including the first time stamp information and the second time stamp information.

In the method, the first time stamp information indicate when the initial random access preamble is transmitted to the BS by using a system frame number.

In the method, the system frame number is indicated by a first number of bits indicating a base and a second number of bits indicating an exponent.

In the method, the UE information request message is received via radio resource control (RRC) signalling.

In the method, the UE information response message is transmitted via radio resource control (RRC) signalling.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. The UTRA is a part of a universal mobile telecommunication system (UMTS). The 3$^{rd}$ generation partnership project (3GPP) long term evolution (LTE) is a part of an evolved UMTS (E-UMTS) using the E-UTRA. The 3GPP LTE uses the OFDMA in the downlink and uses the SC-FDMA in the uplink.

For clarity of explanation, the following description will focus on the 3GPP LTE and its evolution. However, the technical features of this description are not limited thereto.

Figure 1:
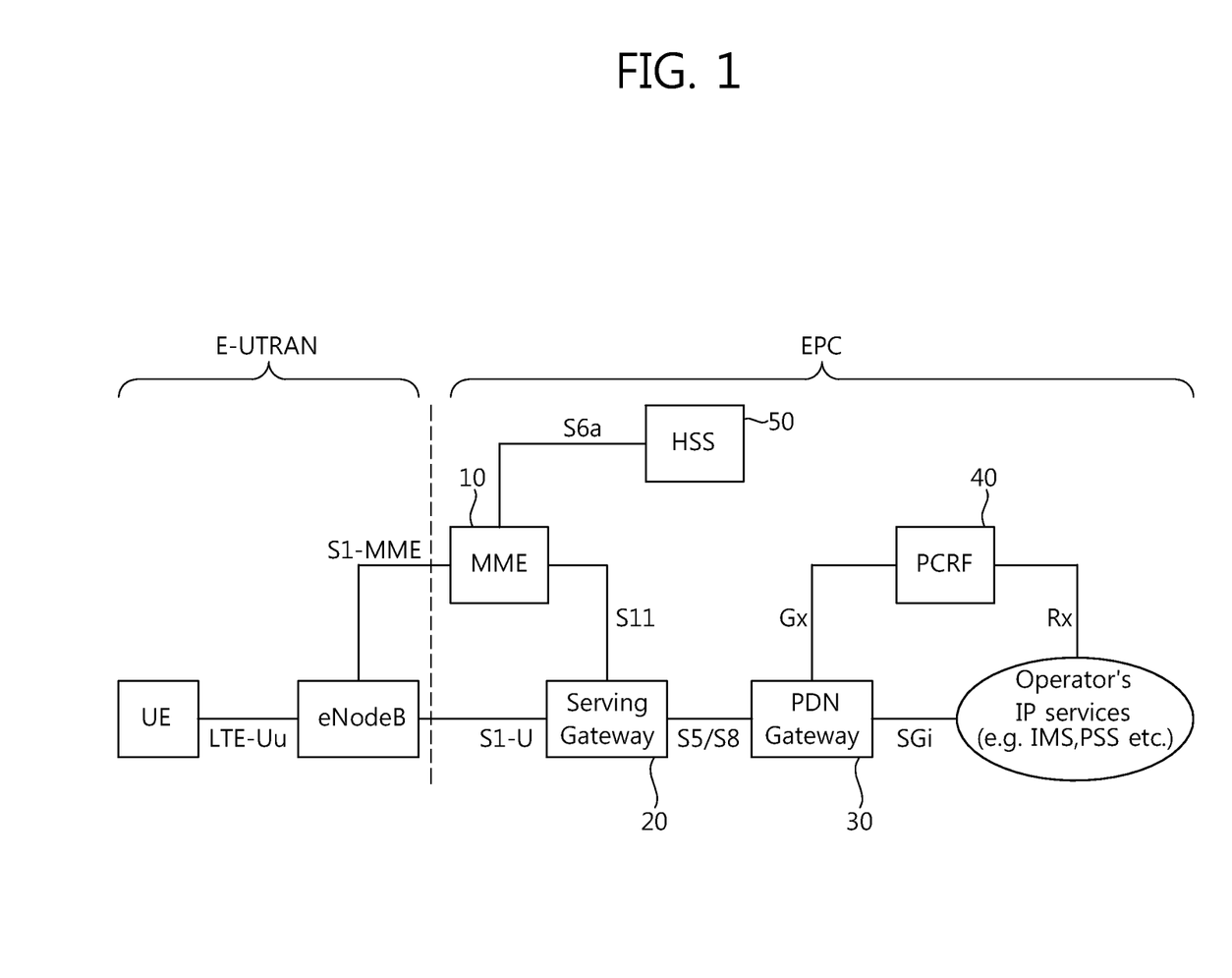
FIG. 1 is a view illustrating an Evolved Packet System which is associated with the Long Term Evolution (LTE) system.

FIG. 1 is a view illustrating an Evolved Packet System which is associated with the Long Term Evolution (LTE) system. The LTE system aims to provide seamless Internet Protocol (IP) connectivity between a user equipment (UE) and a pack data network (PDN), without any disruption to the end user's application during mobility. While the LTE system encompasses the evolution of the radio access through an E-UTRAN (Evolved Universal Terrestrial Radio Access Network) which defines a radio protocol architecture between a user equipment and a base station, it is accompanied by an evolution of the non-radio aspects under the term 'System Architecture Evolution' (SAE) which includes an Evolved Packet Core (EPC) network. The LTE and SAE comprise the Evolved Packet System (EPS).

The EPS uses the concept of "EPS bearers" to route IP traffic from a gateway in the PDN to the UE. A bearer is an IP packet flow with a specific Quality of Service (QoS) between the gateway and the UE. The E-UTRAN and EPC together set up and release the bearers as required by applications.

The EPC, which is also referred to as the core network (CN), controls the UE and manages establishment of the bearers. As depicted in FIG. 1, the node (logical or physical) of the EPC in the SAE includes a Mobility Management Entity (MME) 10, a PDN gateway (PDN-GW or P-GW) 30, a Serving Gateway (S-GW) 20, a Policy and Charging Rules Function (PCRF) 40, a Home subscriber Server (HSS) 50, etc.

The MME 10 is the control node which processes the signaling between the UE and the CN. The protocols running between the UE and the CN are known as the Non-Access Stratum (NAS) protocols. Examples of functions supported by the MME 10 includes functions related to bearer management, which includes the establishment, maintenance and release of the bearers and is handled by the session management layer in the NAS protocol, and functions related to connection management, which includes the establishment of the connection and security between the network and UE, and is handled by the connection or mobility management layer in the NAS protocol layer.

The S-GW 20 serves as the local mobility anchor for the data bearers when the UE moves between eNodeBs. All user IP packets are transferred through the S-GW 20. The S-GW 20 also retains information about the bearers when the UE is in idle state (known as ECM-IDLE) and temporarily buffers downlink data while the MME initiates paging of the UE to re-establish the bearers. Further, it also serves as the mobility anchor for inter-working with other 3GPP technologies such as GPRS (General Packet Radio Service) and UMTS (Universal Mobile Telecommunications System).

The P-GW 30 serves to perform IP address allocation for the UE, as well as QoS enforcement and flow-based charging according to rules from the PCRF 40. The P-GW 30 performs QoS enforcement for Guaranteed Bit Rate (GBR) bearers. It also serves as the mobility anchor for inter-working with non-3GPP technologies such as CDMA2000 and WiMAX networks.

The PCRF 40 serves to perform policy control decision-making, as well as for controlling the flow-based charging functionalities.

The HSS 50, which is also referred to as a Home Location Register (HLR), contains users' SAE subscription data such as the EPS-subscribed QoS profile and any access restrictions for roaming. Further, it also holds information about the PDNs to which the user can connect. This can be in the form of an Access Point Name (APN), which is a label according to DNS (Domain Name system) naming conventions describing the access point to the PDN, or a PDN Address which indicates subscribed IP addresses.

Between the EPS network elements shown in FIG. 1, various interfaces such as an S1-U, S1-MME, S5/S8, S11, S6a, Gx, Rx and SGi are defined.

Figure 2:
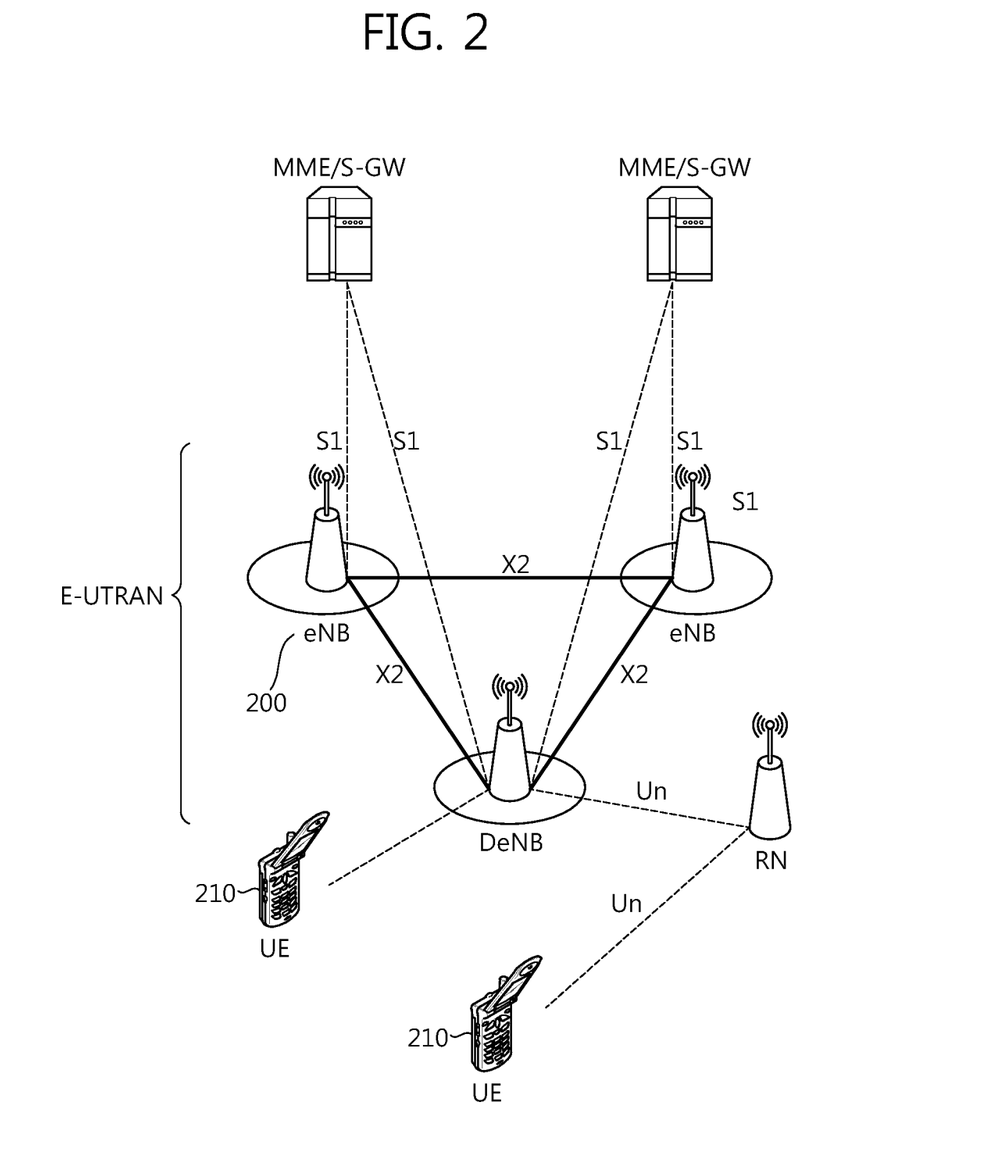
FIG. 2 is a view illustrating an overall architecture of the E-UTRAN to which the following technical features are applied.

FIG. 2 is a view illustrating an overall architecture of the E-UTRAN to which the following technical features are applied.

The E-UTRAN includes at least one eNB (evolved-Node B) 200 providing a user plane and a control plane towards a user equipment (UE) 210. The UE can be fixed or mobile and can be referred to as another terminology, such as a MS (Mobile Station), a UT (User Terminal), an SS (Subscriber Station), an MT (mobile terminal), a wireless device, or the like. The eNB 200 may be a fixed station that communicates with the UE 100 and can be referred to as another terminology, such as a base station (BS), a NB (NodeB), a BTS (Base Transceiver System), an access point, or the like.

The protocols running between the eNBs 200 and the UE 210 are known as the Access Stratum (AS) protocols.

The BSs (or eNBs) 200 are interconnected with each other by means of an X2 interface. The BSs 200 are also connected by means of the S1 interface to the aforementioned EPC (Evolved Packet Core) elements, more specifically to the Mobility Management Entity (MME) by means of the S1-MME and to the Serving Gateway (S-GW) by means of the S1-U.

Further, the E-UTRAN can additionally provide relay functionality. The E-UTRAN can include a Donor eNB (DeNB) that provides at least one Relay Node (RN), with access to the core network. Between the DeNB and RN, an Un interface is defined, whereas an Uu interface is further defined between the RN and the UE.

Hereinafter, the random access procedure is explained. The random access procedure can be initiated with an Access Class (AC) barring. In 3GPP, each UE belongs to an AC in the range 0-9. In addition, some UEs may belong to one or more high priority ACs in the range 11-15, which are reserved for specific uses, e.g., security services, public utilities, PLMN staff, etc. AC 10 is used for emergency access.

The UE checks if access is barred for all its applicable ACs, and relevant control information is transmitted via SystemInformationBlockType2 (SIB2). SIB2 may include a set of AC barring parameter for Mobile Originated (MO) calls and/or MO signaling. This set of parameters comprises a probability factor and a barring timer for ACs 0-9 and a list of barring bits for ACs 11-15. For ACs 0-9, if the UE initiates an MO call and the relevant parameters are included, the UE draws a random number. If the drawn number exceeds the probability factor, access is not barred. Otherwise access is barred for a duration which is randomly selected based on the broadcasted barring timer value. For ACs 11-15, if the UE initiates an MO call and the relevant AC barring parameters are included, access is barred whenever the bit corresponding to all of the UE's AC is set. The behavior is similar in the case of UE-initiated MO signaling.

Figure 3:
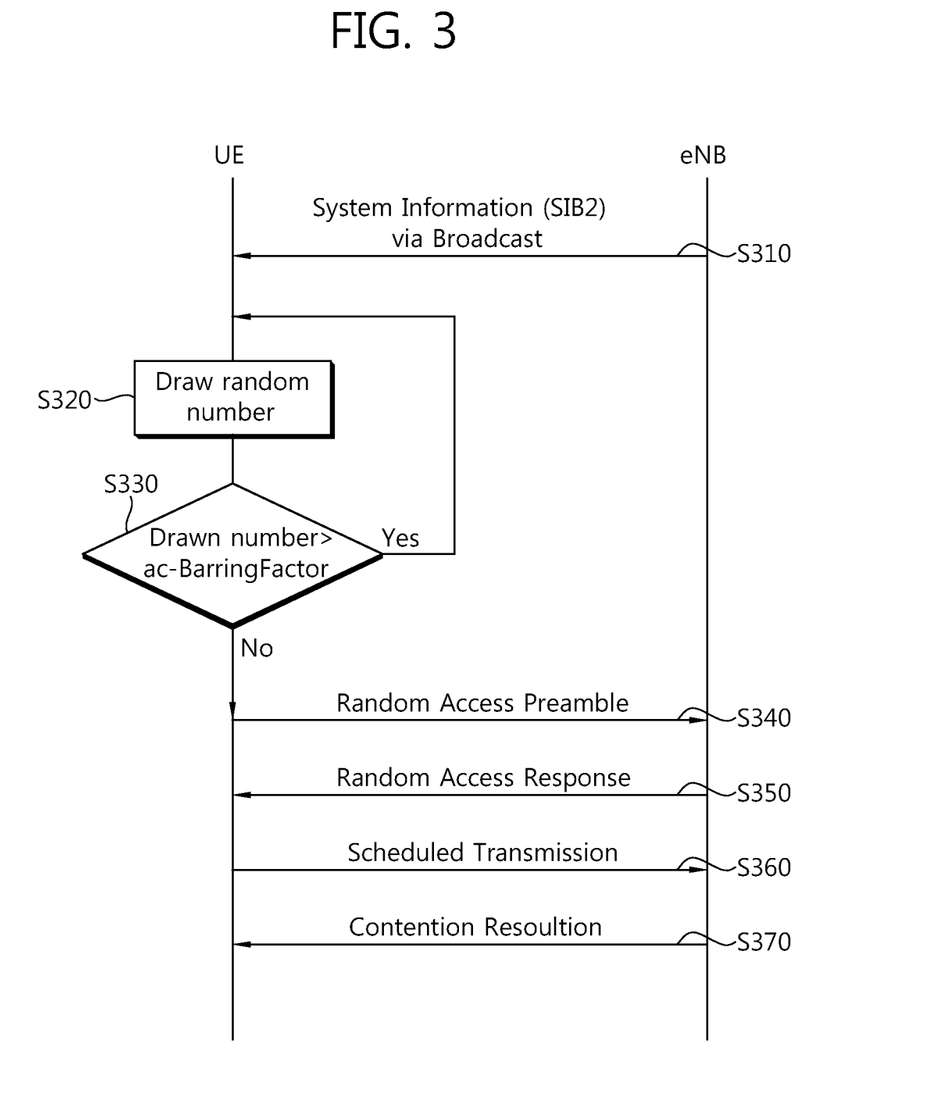
FIG. 3 is a flow diagram showing a random access procedure which is used for an embodiment of the proposed method.

FIG. 3 is a flow diagram showing a random access procedure which is used for an embodiment of the proposed method.

In order to obtain new connection (e.g., a data connection or signaling connection) UEs should first perform a RA procedure and this is a common feature in most cellular system. Further, the RA procedure can be categorized into contention-based and contention-free. The example depicted in FIG. 3 is directed to the contention-based RA procedure.

In step S310, the relevant parameters are transmitted from a base station (e.g., eNB). Various control information can be broadcasted via 'System information', such as Master Information Block (MIB) and System Information Block type k (k=1, 2, . . . ), and the relevant parameters associated with the AC barring are broadcasted via SIB2, as discussed above. As explained above, SIB2 provides information for UEs how they perform the RA procedure. The SIB2 further includes a value for 'ac-BarringFactor', which indicates the probability that a certain UE is supposed to be prevented from attempting the RA procedure to a certain cell. In case of an ordinary call (i.e., MO data call), in step S320, the UE shall draw a random number from a uniform distribution (0,1). If the random number drawn is less than the 'ac-BarringFactor', the UE performs subsequent steps of the RA procedure (S330).

In step S340, a UE selects a particular random access preamble and certain Random Access Channel (RACH) resources from an available random access preamble set and RACH resources, and transmits the selected random access preamble on the selected RACH to an eNB.

In step S350, the eNB receives the random access preamble, and then transmits a random access response to the UE. Further, the random access response includes a time advance (TA) and uplink radio resource allocation information for the transfer of a scheduled message, and also includes an index of the received random access response so that the UE can determine whether the random access response is for the UE. The random access response transmitted on a DL-SCH (downlink-shared channel) may be specified by a DL L1/L2 (downlink layer 1/layer 2) control channel indicated by a random access-radio network temporary identity (RA-RNTI).

The random access response includes information on a back-off, which is used for a back-off process. In particular, if a possible random access response with the transmitted preamble information is received by the UE, one of the UE's tasks is to read or obtain information on back-off interval (BI) from a header of a MAC PDU included in the random access response for the UE. After transmitting a message 3 (i.e., scheduled transmission), if there is no contention resolution, the UE will perform the back-off process by means of randomly choosing a wait-time value for the back-off before it retries for preamble (re-)transmission.

The UE receives or reads the BI index (i.e., BI value) in the received MAC PDU header, performs a random draw from a uniform distribution [0, BI value], and waits for the selected period of time before re-transmission of the random access preamble. Back-off time values indicating the upper limit of back-off time can be defined as the following table.

TABLE 1

| Index | Back-off Parameter value (ms) |
|---|---|
| 0 | 0 |
| 1 | 10 |
| 2 | 20 |
| 3 | 30 |
| 4 | 40 |
| 5 | 60 |
| 6 | 80 |
| 7 | 120 |
| 8 | 160 |
| 9 | 240 |
| 10 | 320 |
| 11 | 480 |
| 12 | 960 |
| 13 | Reserved |
| 14 | Reserved |
| 15 | Reserved |

In step S360, the UE receives the random access response, and then transmits the scheduled message according to radio resource allocation information included in the random access response. The scheduled message, which is also referred to as a message 3, may include a radio resource control (RRC) connection request message.

In step S370, the BS receives the scheduled message from the UE, and then transmits a contention resolution message, which is also referred to as a message 4, to the UE. In order to check whether contention occurs with respect to the message 3, a contention resolution timer is initiated after transmitting the message 3. If the message 4 is not successfully received until the contention resolution timer expires, step 370 may be repeated based on predefined configuration.

Figure 4:
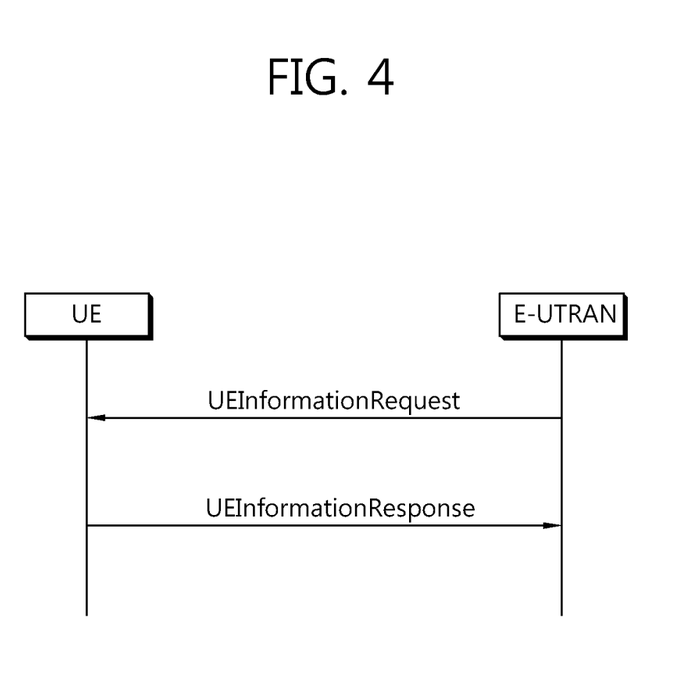
FIG. 4 is a flowchart illustrating a procedure of acquiring UE-related information.

FIG. 4 is a flowchart illustrating a procedure of acquiring UE-related information. In 3GPP, the eNB may request a certain type of information, which is also referred to as UE information, by using an RRC message such as 'UEInformationRequest'. As shown in FIG. 4, the eNB of E-UTRAN may transmit 'UEInformationRequest' to the UE to obtain the UE-related information. In response to the 'UEInformationRequest', the UE transmits 'UEInformationResponse' based on specific indications included in the 'UEInformationRequest'.

While the procedure depicted in FIG. 4 is not a part of the random access procedure depicted in FIG. 3, information associated with the random access procedure can be delivered by the 'UEInformationRequest' and 'UEInformationResponse'. For instance, the 'UEInformationRequest' includes 'rach-ReportReq' to instruct the UE to include random access related information in the 'UEInformationResponse'. Based on the 3GPP standards, if the 'rach-ReportReq' is set to 'true', the contents of rach-Report in the 'UEInformationResponse' include one information field, 'numberOfPreamblesSent' and the other field, 'contentionDectected'.

The 'numberOfPreamblesSent' field indicates the number of preambles sent by a MAC layer of the UE for the last successfully completed random access procedure. The 'contentionDectected' field indicates whether contention resolution was not successful as specified in the 3GPP standards for at least one of the transmitted preambles for the last successfully completed random access procedure. For instance, the 'contentionDectected' field is set to 'true', when contention or collision associated with the random access is detected.

In sum, all the information that the eNB is able to collect from RRC signalling related to random access only include: 1) information on the number of preamble transmissions indicating how many times a certain UE has transmitted; and 2) information on whether collision has been detected during the last successfully completed random access procedure. Therefore, there occurs a problem in which the eNB is unable to accurately calculate the time period during which the UE has been attempting random access after the aforementioned AC barring procedure. In particular, as shown in Table 1, the largest back-off interval is 960 ms, which is equal to 96 times longer than the smallest of the back-off parameter values (i.e., 10 ms), and thus merely reporting information on the number of preamble transmissions causes a problem such that the eNB cannot accurately estimate the time period during which the UE has been attempting random access since the variance of back-off intervals is too great.

In more detail, there may be two different cases where the respective preamble transmission numbers are different whereas respective average times taken for random access are identical. For instance, in Case 1, 'UE A' may be assigned a BO of 120 ms and has re-transmitted a preamble three times until its success (4 times of transmission in total), and in Case 2, 'UE B' got assigned a BO of 30 ms and has re-transmitted a preamble twelve times until its success (13 times of transmission in total). In both cases, the average time taken for random access is {upper bound of time*0.5}, i.e., {120 ms*3} *(0.5)=180 ms and {30 ms*12}*(0.5)=180 ms, respectively. This means that they took the same average time for random access. However, what eNB will get reported is information that "4 times of (re-)transmission" and "13 times of (re-)transmission" were made. Thus, reporting information only on the number of preamble transmissions causes a problem such that the eNB cannot accurately estimate the time period during which the UE has been attempting random access.

Therefore, the present description proposes a number of back-off interval report modes to improve the reporting procedure related to the random access procedure. The proposed back-off interval report modes include Method 1 in which detailed information on back-off intervals (BO intervals) is reported.

In detail, when the UE performs random access procedure, the UE receives BO indexes indicating BO intervals as discussed above and stores the received BO indexes per passing the AC baring procedure. If the random access procedure is determined to be successful, the UE prepares information to be reported to the eNB. Specific information reported to the eNB depends on a specific back-off interval report mode. Method 1 includes four different back-off interval report modes, i.e., Method 1a, Method 1b, Method 1c, and Method 1d.

In Method 1a, the UE receives respective BO indexes and stores a sequence of each and every BO interval and reports the stored sequence. For instance, the sequence of BO intervals includes a first information element representing BO interval 1 (i.e., BO parameter value), BO interval 2, . . . , and BO interval n, where n denotes the total number of preambles the number of preambles sent by the MAC layer of the UE for the last successfully completed random access procedure. In one design, the sequence of BO intervals consists of BO interval 1 (or its corresponding BO parameter value) followed by BO interval 2 (or its corresponding BO parameter value), which is repeatedly followed by the sequent BO interval (or its corresponding BO parameter value).

In Method 1b, the UE receives respective BO indexes and stores a total sum of every BO interval represented by BO indexes. Namely, the UE reports report a sum of BO interval 1, BO interval 2, . . . , and BO interval n.

In Method 1c, the UE receives respective BO indexes and stores an average of all BO intervals represented by BO indexes. In Method 1d, the UE receives respective BO indexes and stores a variance of all BO interval represented by BO indexes.

In Method 1 (i.e., Method 1a to Method 1d), each BO interval can be represented by its upper bound (or upper limit) of the BO interval (i.e., BO parameter value). For instance, when BO index indicating '1' which corresponds to a upper limit of '10 ms' is received, its corresponding BO interval can be represented by information indicating '10' (or '10 ms'). While it is possible to store an actual back-off time selected from a uniform distribution between [0, upper bound], Method 1 proposes to store the upper bound of the BO interval to reduce the number of bits representing each of the BO intervals.

It is preferred that eNB should select at least one proper back-off interval reporting mode and instruct the UE to report information based on the back-off interval reporting mode. The back-off interval reporting mode can be instructed by using RRC signalling such as 'UEInformationRequest' and 'UEInformationResponse'. The back-off interval reporting modes can be used individually or in combination. Combination of different reporting modes may be unnecessary when Method 1a is selected whereas other reporting modes can be used in combination.

When back-off interval reporting modes are used, the eNB may instruct the UE to activate such reporting modes by transmitting bitmap information. For instance, a message indicating 4-bit information indicating the back-off interval reporting modes can be used, to indicate combination of Methods 1a-1d.

As discussed above, in one design, the 'UEInformationRequest' can be used for the back-off interval reporting mode. When the 'UEInformationRequest' is used, the above features can be understood in context of the current 3GPP standards (i.e., Section 5.6.5.3, 3GPP TS 36.331 V10.0.0 (2010-12)) as follows.

Upon receiving the UEInformationRequest message, the UE shall:

1> if rach-ReportReq is set to true, set the contents of the rach-Report in the UEInformationResponse message as follows:

2> set the numberOfPreamblesSent to indicate the number of preambles sent by MAC for the last successfully completed random access procedure;

Method 1a:

2> set the intervalInformation1 to indicate the sequence received by MAC for the last successfully completed random access procedure;

Method 1b:

2> set the intervalInformation2 to indicate the total interval received by MAC for the last successfully completed random access procedure;

Method 1c:

2> set the intervalInformation3 to indicate the average of interval received by MAC for the last successfully completed random access procedure;

Method 1d:

2> set the intervalInformation4 to indicate the variance of interval received by MAC for the last successfully completed random access procedure;

2> if contention resolution was not successful as specified in TS 36.321[6] for at least one of the transmitted preambles for the last successfully completed random access procedure:

3> set the contentionDetected to true;

2> else:

3> set the contentionDetected to false;

For instance, when Method 1a is used as a reporting mode in 3GPP standards, relevant information is included in 'intervalInformation1' and transmitted through the 'UEInformationResponse'.

The above features can be further understood in context of the current 3GPP standards (i.e., Section 6.2.2, 3GPP TS 36.331 V10.0.0 (2010-12)) as follows.

```
UEInformationResponse message
-- ASN1START
UEInformationResponse-r9      ::=         SEQUENCE {
    rrc-TransactionIdentifier         RRC-TransactionIdentifier,
    criticalExtensions                           CHOICE {
        c1
CHOICE {
            ueInformationResponse-r9
UEInformationResponse-r9-IEs,
            spare3 NULL, spare2 NULL, spare1 NULL
        },
        criticalExtensionsFuture      SEQUENCE { }
    }
}
UEInformationResponse-r9-IEs ::=  SEQUENCE {
    rach-Report-r9             SEQUENCE {
        numberOfPreamblesSent-r9      INTEGER (1..200),
        contentionDetected-r9         BOOLEAN
    intervalInformation1
    intervalInformation2
    intervalInformation3
    intervalInformation4
    }
                                              OPTIONAL,
    rlf-Report-r9             RLF-Report-r9   OPTIONAL,
    nonCriticalExtension
UEInformationResponse-v930-IEs                OPTIONAL
```

-continued

```
}
UEInformationResponse-v930-IEs ::=    SEQUENCE {
    lateNonCriticalExtension OCTET STRING OPTIONAL,
    nonCriticalExtension    UEInformationResponse-v1020-IEs
OPTIONAL
}
(omitted)
-- ASN1STOP
```

When the above method is provisioned, there is no need to build signaling the type of method to be used. However, in case where the above method is configurable, it should be signaled by the eNB. A message for signaling can be configured in context of the current 3GPP standards (i.e., Section 6.2.2, 3GPP TS 36.331 V10.0.0 (2010-12)) as follows.

```
UEInformationRequest message
-- ASN1START
UEInformationRequest-r9        ::=        SEQUENCE {
    rrc-TransactionIdentifier     RRC-TransactionIdentifier,
    criticalExtensions            CHOICE {
        c1                        CHOICE {
            ueInformationRequest-r9
UEInformationRequest-r9-IEs,
            spare3 NULL, spare2 NULL, spare1 NULL
        },
        criticalExtensionsFuture  SEQUENCE { }
    }
}
UEInformationRequest-r9-IEs ::=   SEQUENCE {
    rach-ReportReq-r9               BOOLEAN,
    rach-ReportReqIntervalMeasureMethod   {Method  1a,
Method  1b, Method 1c, Method 1d},
    rlf-ReportReq-r9               BOOLEAN,
    nonCriticalExtension           UEInformationRequest-v930-IEs
    OPTIONAL
}
UEInformationRequest-v930-IEs ::= SEQUENCE {
    lateNonCriticalExtension       OCTET STRING
    OPTIONAL,    -- Need OP
    nonCriticalExtension           UEInformationRequest-
v1020-IEs       OPTIONAL
}
UEInformationRequest-v1020-IEs ::=   SEQUENCE {
    logMeasReportReq-r10
    ENUMERATED {true}              OPTIONAL,   -- Need ON
    nonCriticalExtension
    SEQUENCE { }                   OPTIONAL   -- Need OP
}
-- ASN1STOP
```

The aforementioned Method 1 can achieve the following technical effects. In particular, through the use of the first and second order statistics (the average is the first order statistics, the variance+(average)^2 is the second order statistics), it is possible to more accurately predict the shape of the probability distribution and this can increase the statistical significance of estimating the RACH load. The use of the conventional standard technology cannot produce accurate information since the variation (10 ms to 960 ms) is large.

In addition to the aforementioned Method 1, the present description further proposes additional methods to improve the reporting procedure related to random access procedure. In more detail, the proposed back-off interval report modes includes Method 2 in which the UE reports information on when an initial random access preamble is transmitted and on when a contention resolution message is received. Such report information can be request by the 'UEInformationRequest' from the eNB and transmitted by the 'UEInformation-Response' to the eNB. Method 2 can be used independently from or together with Method 1. Namely, Method 2 can be used in combination with at least one of Methods 1a-1d.

In Method 2, first time stamp information and second time stamp information are used to indicate when an initial RA preamble was transmitted to the BS and when contention resolution was successfully achieved. While Method 1 reports information on BO intervals, Method 2 reports exact time information associated with the preamble transmission and contention resolution. In more detail, the first time stamp information indicates 'start time' when the UE started transmitting a preamble. Further, the second time stamp information indicates time when it succeeded in contention resolution. By reporting the first and second time stamp information, the UE can obtain information on 'workout period' between the initial preamble transmission and the contention resolution.

Figure 5:
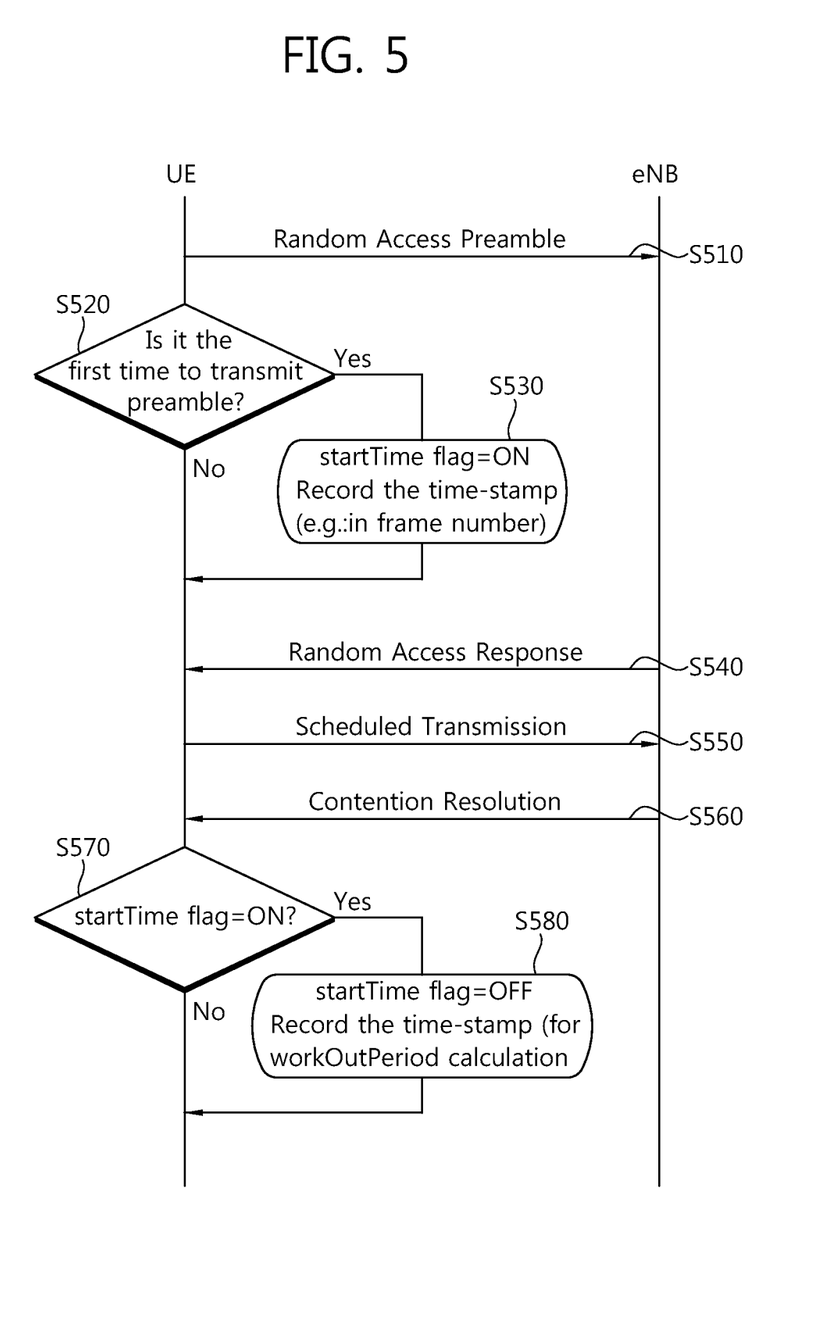
FIG. 5 is a flowchart illustrating a method of recording time-stamp to indicate the 'start time' and 'workout period'.

FIG. 5 is a flowchart illustrating a method of recording time-stamp to indicate the 'start time' and 'workout period'. In Step S510, the UE transmits a RA preamble to the eNB. In Step S520, the UE determines whether the RA preamble transmitted to the eNB is an initial RA preamble transmitted for a new random access procedure. In Step S530, if it is the first time to transmit the RA preamble, the UE sets flag information (i.e., startTime flag) 'on', and records the time stamp information for the initial RA preamble. The time stamp information indicating the 'start time' represents the time when the initial random access preamble is transmitted to the BS. The time stamp information can be configured based on a frame number of a certain frame such as a system frame number (SFN), or based on system clock equipped in the UE.

Steps S540-S560, RA response, scheduled message, and contention resolution message are sequentially transmitted. Referring to Step S570, if the UE succeed in contention resolution, the UE further determines whether the flag information (i.e., startTime flag) is set on. Referring to Step S580, if the flag is set, the UE sets the flag information off and records another time stamp information to indicate the time when it succeeded in contention resolution. Since the UE stores two different time stamps, the workout period between the initial RA preamble transmission and the contention resolution can be calculated.

As discussed above, the 'start time' can be represented by a frame number of a certain frame. In more detail, the frame number can be represented in a 'N-bit stream (or N-bit information)'. Further, the N-bit stream can consists of two parts, the first part indicating a base and the second part indicating an exponent. When bits assigned for the base are M bits, the exponent can be indicated by M-N bits. The value of the 'base' can be pre-defined or signal from the eNB. For example, if N=5 and M=2, and if base is set to '2', N-bit information '10001' denotes 2" {001}=2. The unit of the value can be frame number of a certain-size of batch for the frame number.

The time stamp information indicating when the UE succeeded in contention resolution can be configured in various ways. For instance, such time stamp information can be differential (or delta) information indicating a change of frame numbers between the initial RA preamble transmission and the contention resolution. Alternatively, it can be represented by the same way as the 'start time', which represents an absolute position of the frame.

Method 2 can be triggered when 'rach-ReportReq' in the 'UEInformationRequest' is set to 'true'. In more detail, Method 2 can be defined in the context of the current 3GPP standards (i.e., Section 5.6.5.3, 3GPP TS 36.331 V10.0.0 (2010-12)) as follows.

Upon receiving the UEInformationRequest message, the UE shall:

1> if rach-ReportReq is set to true, set the contents of the rach-Report in the UEInformationResponse message as follows:

2> set the numberOfPreamblesSent to indicate the number of preambles sent by MAC for the last successfully completed random access procedure;

2> if contention resolution was not successful as specified in TS 36.321 [6] for at least one of the transmitted preambles for the last successfully completed random access procedure:

3> set the contentionDetected to true;

2> set the startTime and workOutPeriod to indicate when the UE started transmitting a preamble and when it succeeded in contention resolution:

2> else:

3> set the contentionDetected to false;

When reporting information based on Method 2, the 'UEInformationResponse' can be used. In more detail, the 'UEInformationResponse' can be configured in context of the current 3GPP standards (i.e., Section 6.2.2, 3GPP TS 36.331 V10.0.0 (2010-12)) as follows.

```
UEInformationResponse message
-- ASN1START
UEInformationResponse-r9 ::=    SEQUENCE {
    rrc-TransactionIdentifier       RRC-
                                    TransactionIdentifier,
    criticalExtensions              CHOICE {
        c1                          CHOICE {
            ueInformationResponse-r9  UEInformationResponse-
r9-IEs,
            spare3 NULL, spare2 NULL, spare1 NULL
        },
        criticalExtensionsFuture    SEQUENCE { }
    }
}
UEInformationResponse-r9-IEs ::=  SEQUENCE {
    rach-Report-r9                  SEQUENCE {
        numberOfPreamblesSent-r9      INTEGER (1..200),
        contentionDetected-r9         BOOLEAN
        startTime                     TBD
        workOutPeriod                 TBD
    }
                                    OPTIONAL,
    rlf-Report-r9    RLF-Report-r9  OPTIONAL,
    nonCriticalExtension            UEInformationResponse-
                                    v930-IEs
        OPTIONAL
}
...
-- ASN1STOP
```

As explained above, it is preferred that the UE should record time-stamp information associated with the RA preamble transmission. Further, it is preferred that the eNB should record time stamp information indicating when a certain BO index is transmitted to a certain UE via the RA response message. The eNB also record BO indexes assigned to UEs.

Figure 6:
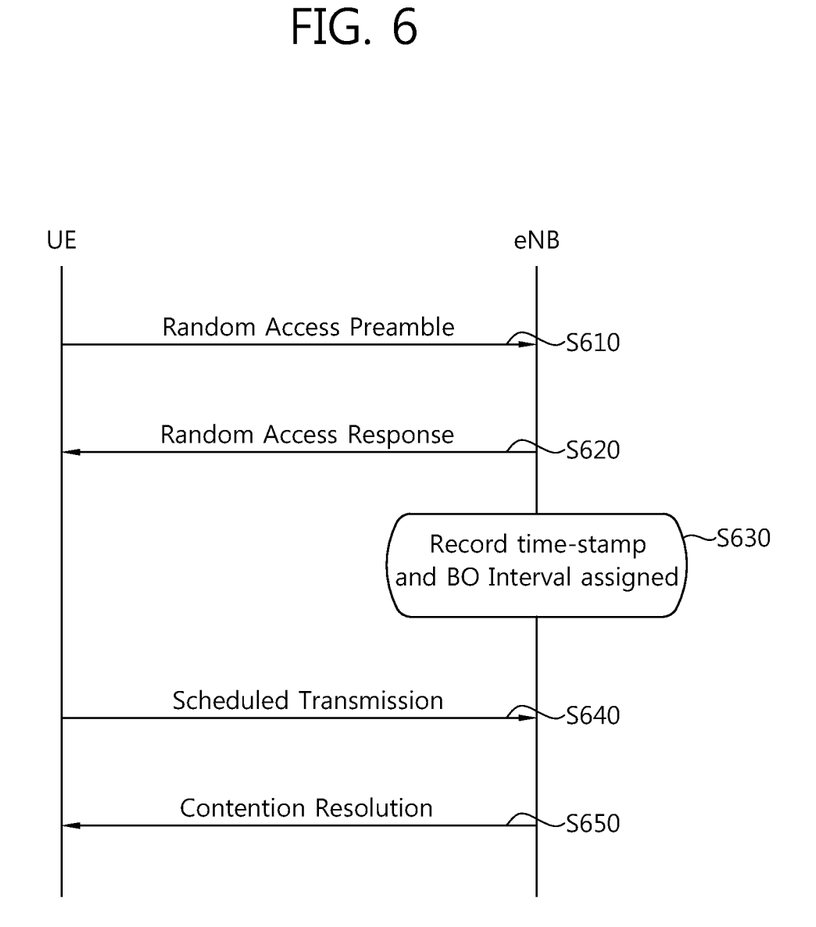
FIG. 6 is a flowchart illustrating a procedure for the eNB to record time stamp information for each BO assignment.

FIG. 6 is a flowchart illustrating a procedure for the eNB to record time stamp information for each BO assignment. As shown in Steps S610-S620, the RA preamble and the RA response are exchanged. Upon performing S620, the eNB records time stamp information for each BO assignment as discussed above. Thereafter, the UE performs scheduled transmission, and the eNB transmits a contention resolution message as depicted in Steps S630-S640.

In one design, information recorded in Step S630 can be deleted after a certain period of time. Further, the eNB can be configured to report statistic information recorded in Step S630 to another network entity such as the MME, if requested.

Method 2 proposes to record and report time-stamp information for RACH performance optimization. Method 2 is beneficial, since the eNB experiencing delay is unable to detect whether the cause of such delay in access delay is due to mis-controlled operation, such as assignment of too short BO intervals, or due to heavy congestion itself on RACH. With the time-stamp information, the UE can optimize the RACH performance.

Figure 7:
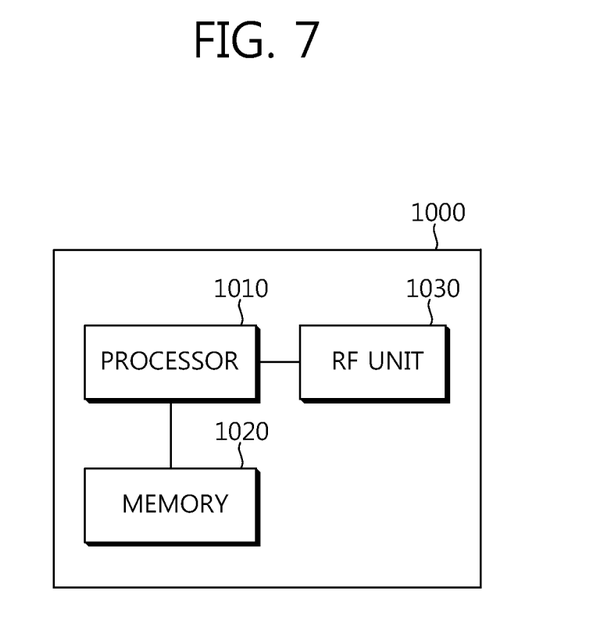
FIG. 7 is a block diagram showing a wireless apparatus to implement technical features of this description.

FIG. 7 is a block diagram showing a wireless apparatus to implement technical features of this description. This may be a part of a UE, an eNodeB/HeNodeB/HNodeB, or a core network (CN) entity. The wireless apparatus 1000 may include a processor 1010, a memory 1020 and a radio frequency (RF) unit 1030.

The processor 1010 may be configured to implement proposed functions, procedures and/or methods described in this description. Layers of the radio interface protocol may be implemented in the processor 1010. The processor 1010 may handle a procedure explained above. The memory 1020 is operatively coupled with the processor 1010, and the RF unit 1030 is operatively coupled with the processor 1010.

The processor 1010 may include application-specific integrated circuit (ASIC), other chipset, logic circuit and/or data processing device. The memory 1020 may include read-only memory (ROM), random access memory (RAM), flash memory, memory card, storage medium and/or other storage device. The RF unit 1030 may include baseband circuitry to process radio frequency signals. When the embodiments are implemented in software, the techniques described herein can be implemented with modules (e.g., procedures, functions, and so on) that perform the functions described herein. The modules can be stored in memory 1020 and executed by processor 1010. The memory 1020 can be implemented within the processor 1010 or external to the processor 1010 in which case those can be communicatively coupled to the processor 1010 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the scope of the appended claims.

What is claimed is:

1. A method of reporting control information to a base station (BS) in a wireless communication system using a number of orthogonal frequency division multiplexing (OFDM) symbols, the method performed by a user equipment (UE) and comprising:

transmitting a random access preamble to a base station;
   if the random access preamble is an initial random access preamble transmitted after a new random access procedure is initiated, storing first time stamp information indicating when the initial random access preamble is transmitted to the BS, and setting flag information on;
   receiving, in response to the random access preamble, a random access response from the BS;
   transmitting, in response to the random access response, a scheduled message to the BS;
   receiving, in response to the scheduled message, a contention resolution message from the BS;
   if the flag information is set to on, storing, in response to the contention resolution message, second time stamp information indicating when contention resolution message is received, and setting the flag information off;
   receiving a UE information request message from the BS; and
   transmitting, in response to the UE information request message, a UE information response message including the first time stamp information and the second time stamp information,
   wherein the first time stamp information indicates when the initial random access preamble is transmitted to the BS by using a system frame number,
   wherein the system frame number is indicated by a first number of bits indicating a base and a second number of bits indicating an exponent, and
   wherein the second time stamp information is indicated by a differential information indicating a change of frame numbers between the transmission of the initial random access preamble and the reception of the contention resolution message.

2. The method of claim 1, wherein the UE information request message is received via radio resource control (RRC) signalling.

3. The method of claim 1, wherein the UE information response message is transmitted via radio resource control (RRC) signalling.

4. A user equipment (UE) for reporting control information to a base station (BS) in a wireless communication system using a number of OFDM symbols, the UE comprising:
   a processor configured to:
   transmit a random access preamble to a base station;
   if the random access preamble is an initial random access preamble transmitted after a new random access procedure is initiated, storing first time stamp information indicating when the initial random access preamble is transmitted to the BS, and setting flag information on;
   receive, in response to the random access preamble, a random access response from the BS;
   transmit, in response to the random access response, a scheduled message to the BS;
   receive, in response to the scheduled message, a contention resolution message from the BS;
   if the flag information is set to on, store, in response to the contention resolution message, second time stamp information indicating when contention resolution message is received, and set the flag information off;
   receive a UE information request message from the BS; and
   transmit, in response to the UE information request message, a UE information response message including the first time stamp information and the second time stamp information,
   wherein the first time stamp information indicates when the initial random access preamble is transmitted to the BS by using a system frame number,
   wherein the system frame number is indicated by a first number of bits indicating a base and a second number of bits indicating an exponent, and
   wherein the second time stamp information is indicated by a differential information indicating a change of frame numbers between the transmission of the initial random access preamble and the reception of the contention resolution message.

5. The user equipment of claim 4, wherein the UE information request message is received via radio resource control (RRC) signalling.

6. The user equipment of claim 4, wherein the UE information response message is transmitted via radio resource control (RRC) signalling.

* * * * *